United States Patent [19]

Sugiyama et al.

[11] 4,110,115
[45] Aug. 29, 1978

[54] PHOTOGRAPHIC LIGHT-SENSITIVE ELEMENT HAVING DYED LAYER

[75] Inventors: Masatoshi Sugiyama; Eiichi Kato, both of Minami Ashigara, Japan

[73] Assignee: Fuji Photo Film Co., Ltd., Minami Ashigara, Japan

[21] Appl. No.: 794,186

[22] Filed: May 5, 1977

[30] Foreign Application Priority Data

May 6, 1976 [JP] Japan .................................. 51-51452

[51] Int. Cl.$^2$ ................................................ G03C 1/84
[52] U.S. Cl. ...................................... 96/84 A; 96/74; 252/300
[58] Field of Search ................. 96/84 R, 84 A, 57

[56] References Cited

U.S. PATENT DOCUMENTS

| | | | |
|---|---|---|---|
| 3,016,306 | 1/1962 | Mader et al. | 96/84 R |
| 3,282,699 | 11/1966 | Jones et al. | 96/84 R |
| 3,615,545 | 10/1971 | Kalenda | 96/84 R |
| 3,932,188 | 1/1976 | Tanaka et al. | 96/84 R |

*Primary Examiner*—J. Travis Brown
*Attorney, Agent, or Firm*—Sughrue, Rothwell, Mion, Zinn and Macpeak

[57] ABSTRACT

A silver halide photographic light-sensitive element having at least one hydrophilic colloid layer containing at least one basic polymer and at least one merocyanine dye represented by the following general formula (I):

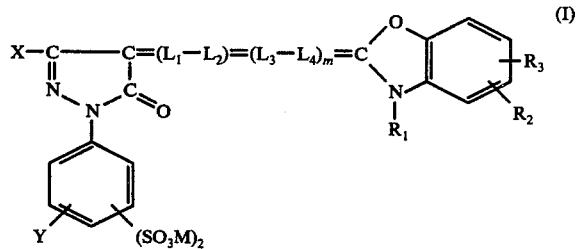

wherein X represents an alkyl group, an aralkyl group, an aryl group, an alkoxy group, a hydroxy group, an amino group, a carboxy group or an alkoxycarbonyl group; Y represents a hydrogen atom, a halogen atom, a lower alkyl group, a hydroxy group or a sulfo group; $R_1$ represents an alkyl group; $R_2$ and $R_3$, which may be the same or different, each represents a hydrogen atom, a halogen atom, an alkyl group, an alkoxy group or an alkoxycarbonyl group; $L_1$, $L_2$, $L_3$ and $L_4$ each represents a methine group; $m$ represents 0 or 1; and M represents a cation.

21 Claims, No Drawings

PHOTOGRAPHIC LIGHT-SENSITIVE ELEMENT HAVING DYED LAYER

BACKGROUND OF THE INVENTION

1. Field of the Invention

The present invention relates to a silver halide photographic light-sensitive element having a dyed hydrophilic colloid layer.

2. Description of the Prior Art

In silver halide photographic light-sensitive elements, dyeing the photographic emulsion layers or other hydrophilic colloid layers so as to absorb light of a specific wavelength range has often been done.

When it is necessary to control the spectral composition of the light passing into the photographic emulsion layer, a dyed layer is generally provided at a position farther from the support than from the photographic emulsion layer. Such a dyed layer is called a filter layer. Where a plurality of photographic emulsion layers is present, the filter layer may be positioned between two of the layers.

Provision of a dyed layer, called an antihalation layer, between the photographic emulsion layer and the support or on the back of the support has been employed in order to inhibit blurring of images, that is, halation, caused by the phenomenon where light rays scattered after or during passage through the photographic emulsion layer are reflected at an interface between the emulsion layer and the support or at the surface of the support opposite to that upon which the emulsion layer is coated back into the photographic emulsion layer again. In cases where a plurality of photographic emulsion layers is present, the antihalation layer may be positioned between two of the emulsion layers.

In order to prevent a degradation of image sharpness caused by a scattering of light in the photographic emulsion layers (this phenomenon is generally called irradiation), dyeing of the photographic emulsion layers has been employed.

Usually water soluble dyes are added to those hydrophilic colloid layers which are to be dyed. These dyes must have the following characteristics.

(1) The dyes must have an appropriate spectral absorption corresponding to their use.

(2) The dyes must be photochemically inert. Namely, they must not have an adverse chemical influence upon the silver halide photographic emulsion layers, for example, decrease the sensitivity, degrade the latent image or cause fog to occur, etc.

(3) The dyes must be decolored during photographic processings or must be removed by dissolution into processing solutions or in water used for washing and a disadvantageous residual color must not remain on the photographic light-sensitive elements after processing.

Many attempts have been made by persons skilled in the art in order to find dyes which satisfy these requirements. For example, oxonol dyes such as the dyes described in British Pat. No. 506,385, U.S. Pat. Nos. 3,247,127, 2,533,472 and 3,379,533 and British Pat. No. 1,278,621, hemioxonol dyes such as the dyes described in British Pat. No. 584,609, styryl dyes such as the dyes described in U.S. Pat. No. 2,298,733, merocyanine dyes such as the dyes described in U.S. Pat. No. 2,493,747 and cyanine dyes such as the dyes described in U.S. Pat. No. 2,843,486 are known.

Many of the dyes which are to be decolored in the processing of the photographic emulsion layers are decolored by sulfites (or bisulfites) present in a development processing solution or by such salts under alkaline conditions, e.g., as described in, for example, British Pat. No. 506,385.

Where the dyed layer is a filter layer or is an antihalation layer positioned on the same side of the support as the photographic emulsion layer, it is often necessary for that layer only to be dyed selectively and other layers not to be substantially dyed. If this is not so, the dyed layer not only causes a disadvantageous spectral effect on the other layers but also the effect of this layer as a filter layer or an antihalation layer is deteriorated.

Many methods of dyeing selectively a specific hydrophilic colloid layer are known. However, the most commonly used method comprises incorporating a hydrophilic polymer having an opposite electric charge to the dye ion as a mordant in the hydrophilic colloid layer, by which the dyes is present only in that specific layer due to an interaction between the mordant and the dye molecule (which is based not only on adsorption by means of electric charges but also on formation of hydrophobic bonds). For instance, polymers derived from ethylenically unsaturated compounds having a dialkylaminoalkyl ester residue described in British Pat. No. 685,475, reaction products prepared by reacting polyvinyl alkyl ketone with aminoguanidine as described in British Pat. No. 850,281, and polymers derived from 2-methyl-1-vinylimidazole as described in U.S. Pat. No. 3,445,231 are known as mordants. Where a method of mordanting using such polymers is used, when the layer to which the dye was added is brought into contact with other hydrophilic colloid layers in a wet state, a portion of the dye sometimes diffuses from the former layer to the latter layer. The diffusion of the dye depends upon not only the chemical structure of the mordant but also on the chemical structure of the dye used.

Where the above described high molecular weight mordants are used, residual color on the light-sensitive elements easily occurs after photographic processings, and, particularly, after processing in which a shortened processing time is used. The reason for this is believed to be because the dye or reversible decolored products remain in the mordant containing layer and because the mordant still has a certain degree of bonding strength to the dye although the bonding strength of the mordant to the dye becomes fairly weak in alkaline solutions such as a developing solution. Such a difficulty also depends upon the chemical structure of the mordant and that of the dye.

Of the various water soluble dyes, merocyanine dyes having a benzoxazole nucleus as a basic nucleus and a pyrazolin-5-one nucleus as an acidic nucleus are known as dyes suitable for dyeing hydrophilic colloid layers of photographic light-sensitive materials since they are decolored in a developer solution containing sulfites and do not have any adverse influence upon the photographic properties of photographic emulsions. For example, the dyes described in U.S. Pat. No. 3,282,699 are known. However, the dyes described in U.S. Pat. No. 3,282,699 are not sufficiently mordanted and it is impossible to prevent a diffusion of the dyes into a layer which does not contain a mordant when a basic polymer having a specific structure is not used as a mordant, as described in U.S. Pat. No. 3,282,699.

SUMMARY OF THE INVENTION

A first object of the present invention is to provide a silver halide photographic light-sensitive element wherein only a hydrophilic colloid layer containing a basic polymer is selectively dyed.

A second object of the present invention is to provide a photographic light-sensitive element having a hydrophilic colloid layer which contains a dye which does not result in a residual color remaining after photographic processing even if a basic polymer is included in any one of the hydrophilic colloid layers, composing the light-sensitive element.

A third object of the present invention is to provide a photographic light-sensitive element having a hydrophilic colloid layer which contains a water soluble dye which is decolored during photographic processing and which does not adversely influence the photographic properties of photographic emulsions.

These objects of the present invention are accomplished with a silver halide photographic light-sensitive element having at least one hydrophilic colloid layer containing at least one basic polymer and at least one merocyanine dye comprising a pyrazolin-5-one nucleus which is substituted at the 1-position with a phenyl group having at least two sulfo groups and a benzoxazole nucleus.

DETAILED DESCRIPTION OF THE INVENTION

The dyes which can be used in the present invention are represented by the following general formula (I):

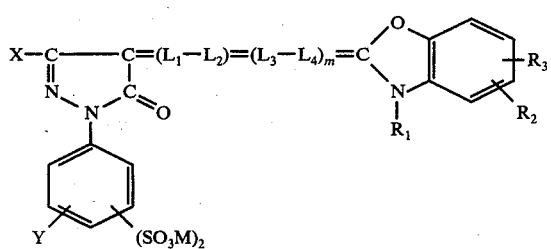

wherein X represents an alkyl group, an aralkyl group, an aryl group, an alkoxy group, a hydroxy group, an amino group, a carboxy group or an alkoxycarbonyl group. The above described alkyl group is preferably an alkyl group having 1 to 18 carbon atoms (for example, a methyl group, an ethyl group, an isopropyl group, an n-butyl group, a tert-butyl group, an n-hexyl group, a heptadecyl group, etc.), more particularly, an alkyl group having 1 to 4 carbon atoms. The aralkyl group is preferably an aralkyl group having 7 to 10 carbon atoms (for example, a benzyl group, etc.). The aryl group is preferably a phenyl group which can be unsubstituted or substituted. Suitable examples of substituents include one or more of a halogen atom (for example, a chlorine atom, a bromine atom, etc.), an alkyl group having 4 or less carbon atoms (for example, a methyl group, an ethyl group, etc.), an alkoxy group having 4 or less carbon atoms (for example, a methoxy group, etc.), and the like. The alkoxy group represented by X is preferably an alkoxy group having 1 to 18 carbon atoms (for example, a methoxy group, an ethoxy group, etc.). Suitable amino groups include not only an unsubstituted amino group but also a mono-substituted or di-substituted amino group. For example, the substituent can be an alkyl group having 4 or less carbon atoms which can be further substituted, for example, with one or more of a halogen atom, a cyano group, a sulfo group or a hydroxy group, a carbacyl group having 2 to 6 carbon atoms (for example, an acetyl group, a propionyl group, a butyryl group, etc.), a phenyl group which can be substituted, and the like. The alkoxycarbonyl group is preferably an alkoxycarbonyl group having 2 to 20 carbon atoms (for example, a methoxycarbonyl group, an ethoxycarbonyl group, a butoxycarbonyl group, etc.).

Y represents a hydrogen atom, a halogen atom (for example, a chlorine atom, a bromine atom, etc.), a lower alkyl group having 1 to 4 carbon atoms (for example, a methyl group, an ethyl group, etc.), a hydroxy group or a sulfo group. Of these groups a hydrogen atom and a halogen atom are particularly preferred.

M represents a cation such as a hydrogen atom, an alkali metal atom (for example, sodium, potassium, etc.), an alkaline earth metal atom (for example, calcium, barium, etc.), an inorganic onium ion, organic onium ion (for example, ammonium, triethylammonium, pyridinium, piperidinium, morpholinium, etc.), and the like.

$R_1$ represents an alkyl group having 1 to 12 carbon atoms. The alkyl group includes not only an unsubstituted alkyl group (for example, a methyl group, an ethyl group, an n-propyl group, an isopropyl group, an n-butyl group, an n-hexyl group, etc.), but also a substituted alkyl group. The substituents can be one or more of a halogen atom (for example, a chlorine atom, a bromine atom, etc.), a cyano group, a carboxy group, a sulfo group, a sulfoalkoxy group having 1 to 6 carbon atoms (for example, a sulfopropoxy group, etc.), an alkoxycarbonyl group having 2 to 7 carbon atoms (for example, an ethoxycarbonyl group, a butoxycarbonyl group, etc.), a phenyl group, etc.

$R_2$ and $R_3$, which may be the same or different, each represents a hydrogen atom, a halogen atom (for example, a chlorine atom, a bromine atom, etc.), a lower alkyl group having 1 to 6 carbon atoms (for example, a methyl group, an ethyl group, an n-propyl group, an isopropyl group, etc.), an alkoxy group having 1 to 6 carbon atoms (for example, a methoxy group, an ethoxy group, etc.), or an alkoxycarbonyl group having 2 to 5 carbon atoms (for example, a methoxycarbonyl group, an ethoxycarbonyl group, etc.).

$L_1$, $L_2$, $L_3$ and $L_4$ each represents a methine group. The methine group includes an unsubstituted methine group and a methine group substituted with one or more of an alkyl group having 1 to 4 carbon atoms (for example, a methyl group, an ethyl group, etc.), or a phenyl group.

$m$ represents 0 or 1.

Specific examples of the merocyanine dyes which can be used in the present invention are illustrated below. However, the dyes of the present invention are not to be construed as being limited to these examples.

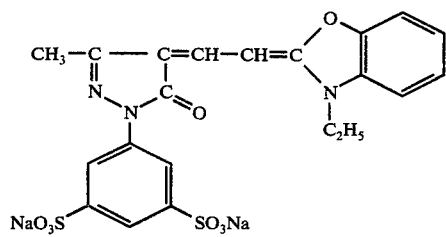
(1)
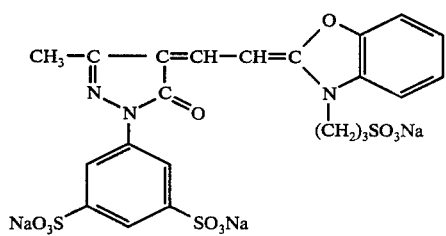
(2)
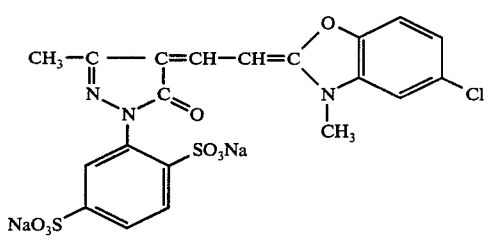
(3)
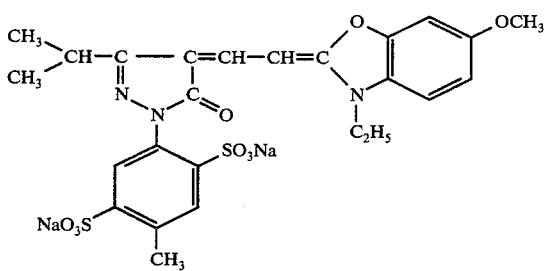
(4)
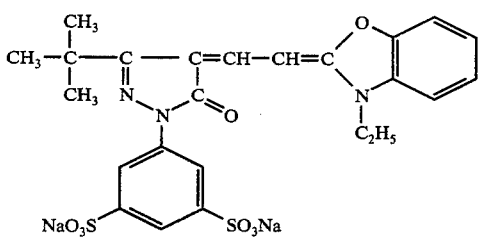
(5)
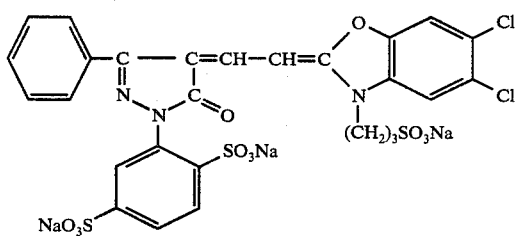
(6)

-continued
(7)
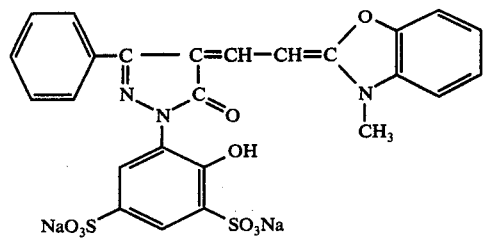
(8)
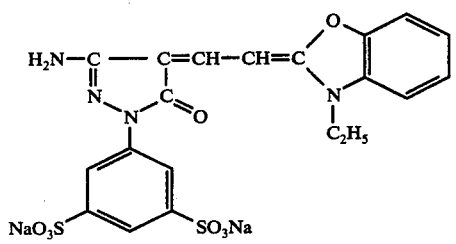
(9)
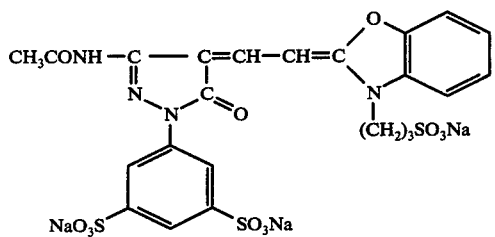
(10)
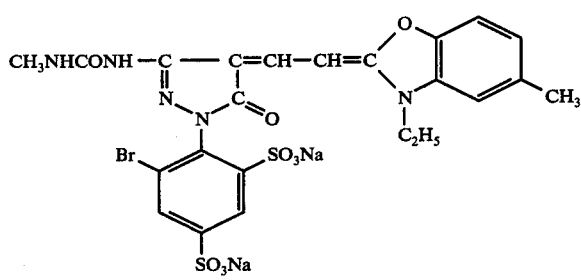
(11)
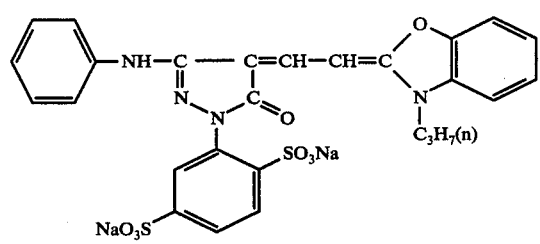
(12)
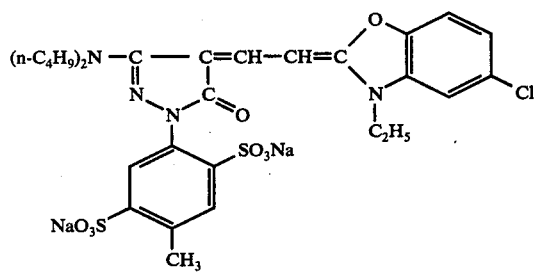

-continued
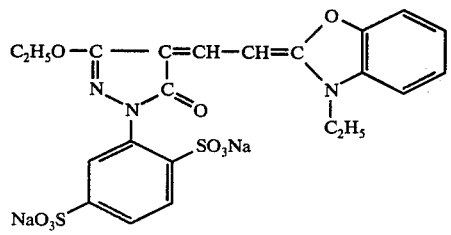 (13)
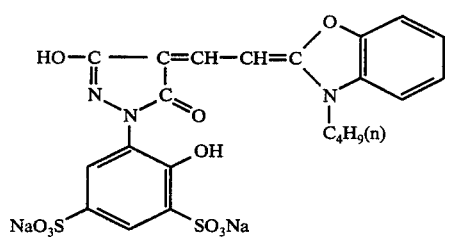 (14)
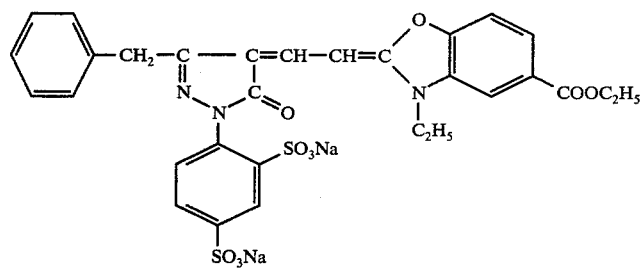 (15)
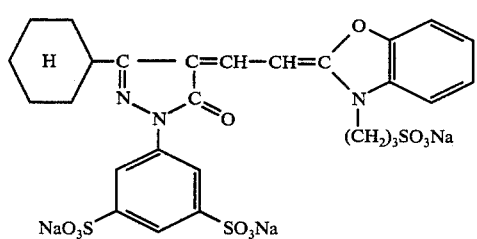 (16)
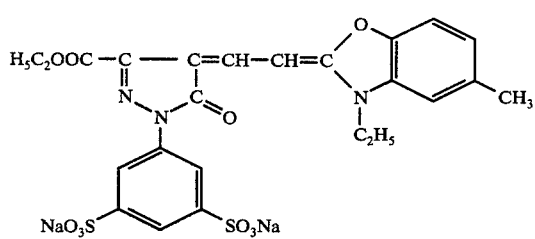 (17)
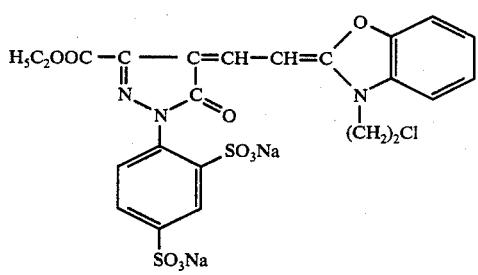 (18)

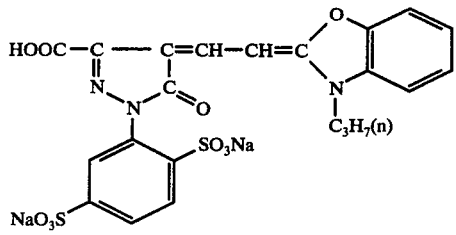

(19)

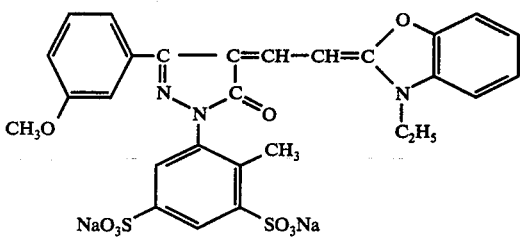

(20)

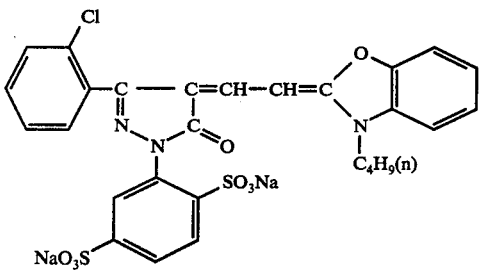

(21)

The merocyanine dyes used in the present invention can be easily synthesized by those skilled in the art using similar processes as used in producing conventional merocyanine dyes. More specifically, suitable synthesis methods are described in F. M. Hamer, *The Cyanine Dyes and Related Compounds*, Interscience Publishers, a division of John Wiley and Sons, New York (1964). Further, intermediates of the merocyanine dyes can be easily synthesized in the same manner as in synthesizing intermediates for conventional merocyanine dyes.

For example, the merocyanine dyes used in the present invention can be easily synthesized by reacting suitable intermediate compounds, such as anilinomethylene compounds or acetanilidomethylene compounds with pyrazolin-5-one compounds using a suitable basic condensing agent (such as pyridine, piperidine or triethylamine, etc.) with reference to the disclosure of U.S. Pat. Nos. 3,071,467, 2,493,747, 2,493,748, 2,497,876, 3,440,052, 3,440,051, 3,445,684, 3,379,533, 3,282,699, 3,480,439, 3,384,486, 3,364,026, 3,288,610, 2,743,273, 2,856,404, 2,882,159 and 2,778,822.

The synthesis of the dyes used in the present invention is specifically illustrated by reference to the following examples. Unless otherwise indicated herein, all parts, percentages, ratios and the like are by weight.

SYNTHESIS EXAMPLE 1

Synthesis of Dye 1

8.6 g of 2-(2'-acetanilinovinyl)-3-(3'-ethyl)-benzoxazole and 6.8 g of 3-methyl-1-(3',5'-disulfophenyl)-5-pyrazolone were added to 150 ml of ethanol. 6 ml of acetic anhydride was then added to the mixture with stirring. Further, 14 ml of triethylamine was added dropwise thereto and the mixture was heated on a steam bath for 30 minutes for reaction. After the reaction, about a half of the ethanol was removed by distillation and the reaction solution was filtered. To the filtrate, 40 ml of a methanol solution containing 3.2 g of sodium acetate was added dropwise with stirring at room temperature (about 20°–30° C.) and the precipitated crystals were collected by filtration. The impure crystals were added to 300 ml of ethanol and washed for 30 minutes at reflux to obtain 10 g of yellow crystals. The maximum absorption wavelength of an aqueous solution of this dye was 443 nm.

SYNTHESIS EXAMPLE 2

Synthesis of Dye 2

10 g of anhydro-2-(2'-anilinovinyl)-3-(3'-sulfopropyl)-benzoxazolium hydroxide and 6.8 g of 3-methyl-1-(3',5'-disulfophenyl)-5-pyrazolone were added to 200 ml of ethanol. 6 ml of acetic anhydride was then added to the mixture with stirring. Further, 14 ml of triethylamine was added dropwise thereto and the mixture was heated on a steam bath for 30 minutes for reaction. After the reaction, about a half of the ethanol was removed by distillation and the reaction solution was filtered. To the filtrate, 50 ml of a methanol solution containing 4.8 g of sodium acetate was added dropwise with stirring at room temperature and the precipitated crystals were collected by filtration. The impure crystals were added to 300 ml of ethanol and washed for 30 minutes at reflux to obtain 9.8 g of yellow crystals. The maximum absorption wavelength of an aqueous solution of this dye was 445 nm.

SYNTHESIS EXAMPLE 3

Synthesis of Dye 5

This dye was synthesized according to the procedures of Synthesis Example 1. Namely, using 7.5 g of 3-tert-butyl-1-(3',5'-disulfophenyl)-5-pyrazolone, the reaction was carried out under the same conditions to obtain 11.3 g of Dye 5. The maximum absorption wavelength of an aqueous solution of this dye was 447 nm.

SYNTHESIS EXAMPLE 4

Synthesis of Dye 9

This dye was synthesized according to the procedures of Synthesis Example 2. Namely, using 7 g of 3-acetamido-1-(3',5'-disulfophenyl)-5-pyrazolone in place of 6.8 g of 3-methyl-1-(3',5'-disulfophenyl)-5-pyrazolone, the reaction was carried out under the same conditions to obtain 9.5 g of Dye 9. The maximum absorption wavelength of an aqueous solution of this dye was 448 nm.

The dyes can be incorporated into a hydrophilic colloid layer of a photographic light-sensitive element of the present invention using conventional methods. Namely, an aqueous solution of the dyes having a suitable concentration can be added to an aqueous solution of a hydrophilic colloid. The solution is then applied onto a support or onto another layer of the photographic light-sensitive element in a known manner.

The amount of the dyes added to the aqueous solution of the hydrophilic colloid is suitably selected depending on the purpose within the range of the solubility of the dyes. In general, an aqueous solution of the dyes in a concentration of about 0.5 to about 3% by weight so as to provide about 8 to about 800 mg of the dyes per $m^2$ of the photographic light-sensitive element is employed.

In the production of the light-sensitive elements of the present invention, it is advantageous to add the dye to a coating solution for preparing a basic polymer containing hydrophilic colloid layer. However, the dyes can be added to a coating solution for preparing another non-light-sensitive hydrophilic colloid layer. In the latter case, the dyes are preferably added to a layer which is near the basic polymer containing layer and, more preferably, added to an adjacent layer. Even though the dyes are added to a layer which does not contain the basic polymer, the dyes diffuse into the basic polymer containing layer and are concentrated therein by mordanting. Thus, the basic polymer containing layer is selectively dyed in the finished light-sensitive element. The dyes can also be added to two or more layers, if desired.

The basic polymer containing hydrophilic colloid layer can be a single layer or can comprise two or more layers. Such a layer (or layers) can be positioned above the photographic emulsion layer (i.e., farther from the support), between two emulsion layers when a plurality of photographic emulsion layers is present or between the support and the photographic emulsion layer. The layer selectively dyed due to the presence of the basic polymer can function as a filter layer or an antihalation layer or as another layer, depending on the position of the layer.

In the light-sensitive elements of the present invention, the basic polymer is present in at least one hydrophilic colloid layer. The basic polymer is a water soluble high molecular weight material which has basic groups in the main chain or a branched chain thereof and which is compatible with gelatin. Useful basic polymers include, for example, high molecular weight materials which have tertiary or quaternary nitrogen containing basic residues on the main or the side chains, which are basic hydrophilic high molecular weight materials conventionally used for mordanting acid dyes in hydrophilic colloid layers of silver halide photographic light-sensitive elements (a suitable degree of polymerization ranges from about 1,000 to about 1,000,000, preferably 5,000 to 1,000,000, and more preferably 10,000 to 200,000).

Typical examples of such polymers include polymers prepared by polymerizing an ethylenically unsaturated compound having a dialkylaminoalkyl ester group as described in U.S. Pat. No. 2,675,316; copolymers of the above-described ethylenically unsaturated compound and acrylamide as described in U.S. Pat. No. 2,839,401; basic polymers synthesized from maleinimide (including maleinimide derivatives) and copolymers of such maleinimide derivatives and styrene as described in U.S. Pat. Nos. 3,016,306 and 3,488,706; polymers having 2-methylimidazole nuclei in the side chains as described in U.S. Pat. No. 3,445,231; addition polymers prepared from bisacrylamide and secondary diamines and quaternary salts of these polymers as described in U.S. Pat. No. 3,795,519; polymers including polyvinylpyridine or polyvinylquinoline as described in British Pat. No. 765,520 and U.S. Pat. No. 2,721,852 and polymers described in U.S. Pat. No. 3,624,229 and German Patent Application (OLS) No. 1,914,362. The polymers described initially above, i.e., the polymers described in U.S. Pat. No. 2,675,316 are preferably used in the present invention.

Further, polymers prepared by reacting polyvinylalkylketones (for example, polyvinylmethylketone, etc.) or polyvinylaldehydes (for example, polyacrolein, etc.) with aminoguanidine as described in U.S. Pat. No. 2,882,156 can be used. A combination of the specific polymers and the dyes is indispensable for practice of the invention described in U.S. Pat. No. 3,282,699. On the contrary, sufficient results can be obtained according to the present invention by using various polymers as described above.

The amount of the basic mordant polymer which is conventionally used is about 1 to about 5 equivalents of the basic group of the polymer per equivalent of the acid group of the merocyanine dye used in the present invention. Of course, the amount of the basic mordant polymer is not limited to the above-described range.

The hydrophilic colloid layers of the light-sensitive elements of the present invention can contain a variety of additives so as to improve the quality of the photographic light-sensitive elements, such as hardening agents, coating aids, plasticizers, lubricating agents, matting agents, emulsion polymerization latexes, antistatic agents, ultraviolet light absorbing agents or antioxidants, etc., in addition to the hydrophilic colloids, the dyes and the mordants.

Any of silver bromide, silver iodobromide, silver iodobromochloride, silver bromochloride and silver chloride can be used as the silver halide in the photographic emulsion layers of the photographic light-sensitive elements of the present invention.

Gelatin is advantageously used as a binder or a protective colloid of the photographic emulsions. However, other hydrophilic colloids also can be used. For example, gelatin derivatives, graft polymers of gelatin with other high molecular weight materials, proteins, such as albumin or casein, etc., cellulose derivatives, such as hydroxyethyl cellulose or carboxymethyl cellulose, etc., saccharide derivatives, such as agar, sodium alginate or starch derivatives, etc., and hydrophilic synthetic high molecular weight materials, such as partially acetalated polyvinyl alcohol, poly-N-vinylpyrrolidone, polyacrylic acid, polyacrylamide, polyvinylimidazole or polyvinylpyrazole and copolymers thereof can be used.

Not only lime treated gelatin but also acid treated gelatin can be used as the gelatin. Further, gelatin hydrolysis products and gelatin enzymatic decomposition products can be used as well. Examples of suitable gelatin derivatives include those prepared by reacting a compound such as an acid halide, an acid anhydride, an acid ester, an isocyanate, bromoacetic acid, an alkanesultone, a vinylsulfonamide, a maleinimide compound, a polyalkylene oxide or an epoxy compound, etc., with gelatin. Examples of these are described in U.S. Pat. Nos. 2,614,928, 2,763,639, 3,118,766, 3,132,945, 3,186,846 and 3,312,553, British Pat. Nos. 861,414, 1,033,189 and 1,005,784 and Japanese Patent Publication No. 26845/67.

Examples of gelatin graft polymers which can be used are those prepared by grafting homo- or copolymers of vinyl compounds such as acrylic acid, methacrylic acid or derivatives thereof, such as the esters or amides thereof, acrylonitrile or styrene, etc., with gelatin. Particularly, use of gelatin graft polymers prepared by reacting gelatin with polymers having a certain degree of compatibility with gelatin, such as polymers of acrylic acid, methacrylic acid, acrylamide, methacrylamide or hydroxyalkyl methacrylate, etc., is preferred. Examples of these materials are described in U.S. Pat. Nos. 2,763,625, 2,831,767 and 2,956,884.

Useful hydrophilic synthetic high molecular weight materials are those described in, for example, German patent application (OLS) No. 2,312,708 and U.S. Pat. No. 3,879,205.

Although silver halide emulsions which are not chemically sensitized, the so-called primitive emulsions, can be used, chemically sensitized emulsions are usually employed. Chemical sensitization can be carried out according to methods described in P. Grafkides, *Photographic Chemistry*, Paul Montel Co., (1958) or in J. Frieser, *Die Gründlagen der Photographischen Prozesse mit Silberhalogeniden*, Akademische Verlagsgesellschaft, (1968).

More specifically, a sulfur sensitization process which comprises using sulfur containing compounds or activated gelatins which are reactive with silver ions, a reduction sensitization process which comprises using reducing materials or a noble metal sensitization process which comprises using gold or other noble metals can be used. These methods can be used individually or in combination.

The photographic emulsions used in the present invention can be spectrally sensitized with methine dyes or other dyes, if desired.

Examples of suitable dyes which can be used for spectral sensitization include cyanine dyes, merocyanine dyes, complex cyanine dyes, complex merocyanine dyes, holopolar cyanine dyes, hemicyanine dyes, styryl dyes and hemioxonol dyes. Particularly preferred dyes are cyanine dyes, merocyanine dyes and complex merocyanine dyes. These dyes can contain basic heterocyclic nuclei which are utilized conventionally in cyanine dyes. Examples include nuclei, such as a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus and a pyridine nucleus, etc., nuclei in which an alicyclic hydrocarbon ring is fused to the above-described nucleus, and nuclei in which an aromatic hydrocarbon ring is fused to the above-described nuclei, such as an indolenine nucleus, a benzidolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus or a quinoline nucleus, etc. The carbon atoms of these nuclei can be substituted.

The merocyanine dyes or the complex merocyanine dyes can contain 5- or 6-membered heterocyclic nuclei as nuclei having a ketomethylene structure, such as a pyrazolin-5-one nucleus, a thiohydantoin nucleus, a 2-thioxazolidine-2,4-dione nucleus, a thiazolidine-2,4-dione nucleus, a rhodanine nucleus or a thiobarbituric acid nucleus, etc.

Useful sensitizing dyes are those described in German Pat. No. 929,080, U.S. Pat. Nos. 2,231,658, 2,493,748, 2,503,776, 2,519,001, 2,912,329, 2,656,959, 3,672,897 and 3,694,217, British Pat. No. 1,242,588 and Japanese patent publication No. 14030/69.

These sensitizing dyes can be used individually or as a combination of two or more thereof. Combinations of sensitizing dyes are often used for the purpose of supersensitization. Examples of such combinations are described in U.S. Pat. Nos. 2,688,545, 2,977,229, 3,397,060, 3,522,052, 3,527,641, 3,617,293, 3,628,964, 3,666,480, 3,679,428, 3,703,377, 3,769,301, 3,814,609 and 3,837,862, British Pat. No. 1,344,281 and Japanese patent publication No. 4936/68.

The emulsions can contain dyes which do not, per se, give rise to spectral sensitization or materials which do not substantially absorb visible light but give rise to a supersensitization together with the sensitizing dyes.

In the light-sensitive elements of the present invention, the photographic emulsion layers can contain various kinds of compounds in order to prevent the occurrence of fog or to stabilize the photographic properties at production, during storage or during the photographic processing of the light-sensitive elements. More specifically, it is possible to add compounds known as anti-fogging agents or stabilizing agents, such as azoles, for example, benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles or mercaptotetrazoles, etc.; mercaptopyrimidines; mercaptotriazines; thioketo compounds, such as oxazolinethione; azaindenes, for example, triazaindenes, tetrazaindenes and particularly 4-hydroxy-(1,3,3a,7)-tetrazaindenes or pentazaindenes, etc.; benzenethiosulfonic acid, benzenesulfinic acid or benzenesulfonamide, etc., to the emulsions.

In the light-sensitive elements of the present invention, the photographic emulsion layers can contain non-diffusible dye image forming couplers which are conventionally used. A dye image forming coupler is a compound which forms a dye by reacting with the oxidation product of an aromatic primary amine developing agent in photographic development (hereinafter, the dye image forming coupler is merely called a coupler). The couplers can be 4-equivalent or 2-equivalent couplers and can be colored couplers for color correction or couplers which release a development inhibitor (DIR couplers). Open chain ketomethylene compounds such as acylacetamide type compounds are useful as yellow forming couplers. Pyrazolone or cyanoacetyl type compounds are useful as magenta forming couplers. Naphthol or phenol type compounds are useful as cyan forming couplers. The couplers can be incorporated into the photographic emulsion layers using methods conventionally employed for multicolor photographic elements. For example, it is possible to use a method which comprises dispersing the couplers in a hydrophilic colloid together with organic solvents having a high boiling point, such as aliphatic esters, aromatic carboxylic acid alkyl esters, aromatic phosphoric acid esters or aromatic ethers, etc., or a method which comprises adding the couplers as an aqueous alkaline solution to the hydrophilic colloid.

The photographic emulsion layers and other layers in the photographic light-sensitive elements of the present invention are formed by coating on flexible supports conventionally used for photographic light-sensitive elements, such as synthetic resin films, paper or cloth or on rigid supports, such as glass, ceramics or metal, etc. Examples of preferred flexible supports include films composed of synthetic or semi-synthetic high molecular weight materials, such as cellulose nitrate, cellulose acetate, cellulose acetate butyrate, polystyrene, polyvinyl chloride, polyethylene terephthalate or polycarbonate, etc., and coated or laminated papers prepared by coating or laminating baryta or α-olefin polymers (for example, polyethylene, polypropylene or an ethylene-butene copolymer) onto paper.

The present invention can also be applied to multi-layer multicolor photographic elements in which at least two layers are sensitive to light of different spectral ranges. Multilayer color photographic elements have generally at least one red-sensitive silver halide emulsion layer, at least one green-sensitive silver halide emulsion layer and at least one blue-sensitive silver halide emulsion layer on a support. These layers may be positioned in a suitable order. In general, the red-sensitive silver halide emulsion layer contains a cyan forming coupler, the green-sensitive silver halide emulsion layer contains a magenta forming coupler and the blue-sensitive silver halide emulsion layer contains a yellow forming coupler. However, other combinations different from the above-described combinations can be employed, if desired.

According to the present invention, where a dyed hydrophilic colloid layer is provided as a filter layer or an antihalation layer or for another purpose, the light-sensitive element has a sufficient absorption density even if the thickness of the dyed layer is reduced to maintain good resolving power. This is because the dyes used in the present invention have high water solubility and good compatibility with gelatin.

The light-sensitive elements of the present invention and, particularly, the dyed layers are easily and irreversibly decolored by photographic processings and residual color does not remain after processings. Further, photographic processing solutions are not contaminated by a coloration.

In the light-sensitive elements of the present invention, introduction of the dyes into the hydrophilic colloid layers does not adversely influence the photographic properties of the photographic emulsion layers. Namely, the photographic emulsion layers are not desensitized nor the contrast reduced except as a result of the influence of the filter effect of the dyed layer itself (where the dyed layer is positioned nearer incident light of exposure than the emulsion layer). Further, fog does not occur. The photographic properties, either in the wavelength range to which the silver halide is inherently sensitive or in the wavelength range in which the silver halide is spectrally sensitized, are not influenced in the presence of the dye except for the filter effect, even after storage of the light-sensitive elements for a long period of time.

In the light-sensitive elements of the present invention, only the basic polymer containing layers are dyed by the dyes and the dyes do not diffuse into another layer. Therefore, neither an undesirable decrease of sensitivity nor an undesirable degradation of gradation of the photographic emulsion layers due to the undesirable spectral absorption effect generally caused by diffusion of the dyes occurs and, consequently, the light-sensitive elements have excellent photographic characteristics and, particularly, excellent spectral characteristics. This fact is very advantageous in black-and-white or color photographic sensitive elements in which an antihalation layer is positioned between the photographic emulsion layer and the support or color photographic sensitive elements having at least three photographic emulsion layers in which a filter layer which functions as an antihalation layer is positioned between the photographic emulsion layers.

More specifically, if the dyes diffuse from the layer dyed into an emulsion layer positioned above that layer (farther from the support) or into a hydrophilic colloid layer positioned above the emulsion layer, the emulsion layer is subjected to a filter effect by the dyes resulting in a decrease in the sensitivity to light absorbed by the dyes and a lower average gradation.

However, in the light-sensitive elements of the present invention, since the dyes do not diffuse, any decrease of the sensitivity of the emulsion layers positioned above the dyed layer (farther from the support) can be substantially disregarded. Specifically, the decrease does not exceed about 0.06 in logarithmic exposure amount.

The compositions and effects according to the present invention are further illustrated by reference to the following examples.

EXAMPLE 1

The diffusion coefficient in gelatin and the diffusion coefficient from the gelatin phase containing a basic polymer to gelatin for Dye 1 of the present invention, Comparison Dyes A and B each having the formula shown below, were determined in the following manner.

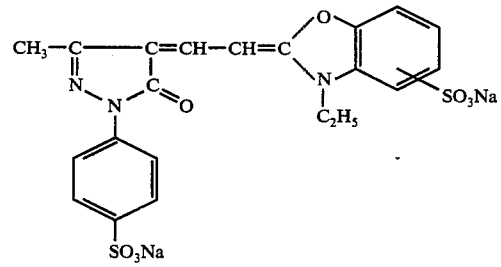

Comparison Dye A

Comparison Dye B

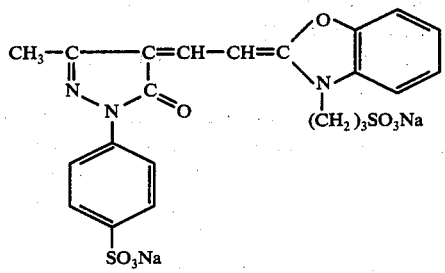

(i) Measurement of the Diffusion Coefficient in Gelatin 100 cc of an aqueous dye-gelatin solution containing 10 g of gelatin and $2 \times 10^{-4}$ mol of dye was prepared. 10 cc of the aqueous dye-gelatin solution was added to a cylindrical cell having a diameter of 1.5 cm and a volume of 10 cc. On this first cylindrical cell a second cylindrical cell of the same size was superposed thereon and the second cylindrical cell had a size the same as that of the first cylindrical cell and contained a 10% aqueous gelatin solution. After standing at 25° C for 4 hours, the two cylindrical cells were separated from each other. The gelatin gel contained in the upper second cylindrical cell was removed and a uniform solution formed. The optical absorption of the solution was measured. The same measurement was made with a sample after standing for 16 hours. Using the diffusion amount of dye thus obtained, the diffusion coefficient (D) of dye in gelatin was determined according to the Fick equation:

$$D = \frac{m^2}{C_o q^2 t} \pi (cm^2/sec)$$

wherein $m$ represents the amount of dye diffused into the second cylindrical cell, $C_o$ represents the initial concentration of the dye in the first cylindrical cell, $q$ represents the cross-sectional area of the cylindrical cells in contact and $t$ represents the time the cylindrical cells were in contact with each other.

(ii) Measurement of the Diffusion Coefficient from Gelatin

Phase Containing a Basic Polymer to Gelatin To 80 cc of an aqueous gelatin-polymer solution containing 10 g of gelatin and 7 cc of a 5% aqueous solution (pH 5.6) of poly[(β-diethylaminoethyl) methacrylate] having a molecular weight of about 70,000, $2 \times 10^{-4}$ of the above-described dye was added as an aqueous solution and water was added until the total volume was 100 cc. Using 10 cc of the solution the diffusion amount was measured after 16 hours and 24 hours at 25° C in the same manner as described in (i) above except that 2.5 weight % of sodium dodecylbenzenesulfonate was present in the gelatin solution of the upper cylindrical cell.

(iii) Results of Measurement of Diffusion Coefficient

The results of measuring the diffusion coefficient are illustrated in Table 1 below.

TABLE 1

| Dye | Diffusion Coefficient (cm²/sec) | |
|---|---|---|
| | (i) In Gelatin | (ii) Together with Mordant |
| Dye 1 of the Present Invention | $9.0 \times 10^{-7}$ | $0.7 \times 10^{-7}$ |
| Comparison Dye A | $10.4 \times 10^{-7}$ | $4.2 \times 10^{-7}$ |

TABLE 1-continued

| Dye | Diffusion Coefficient (cm²/sec) | |
|---|---|---|
| | (i) In Gelatin | (ii) Together with Mordant |
| Comparison Dye B | $10.0 \times 10^{-7}$ | $4.8 \times 10^{-7}$ |

The dye having two sulfo groups on the 1-position of the pyrazolone nucleus according to the present invention shows an extremely small diffusion coefficient from a phase containing a basic polymer to a phase without a basic polymer in comparison with Comparison Dyes A and B which are described in U.S. Pat. No. 3,282,699. That is, the dye according to the present invention is superior to similar known water soluble dyes having a pyrazolone nucleus and a benzoxazole nucleus from the standpoint of mordanting with a basic polymer.

EXAMPLE 2

To a subbed cellulose acetate film, a silver iodobromide emulsion (silver iodide content: 6 mol%) which was spectrally sensitized to red light using anhydro-5,5'-dichloro-9-ethyl-3,3'-d-(3-sulfopropyl)thiacarbocyanine hydroxide and which contained 2,4-dichloro-3-methyl-6-[(2,4-di-tert-amylphenoxy)acetamido]phenol (cyan forming coupler) was applied in a 5 μm thickness. To the resulting layer, a gelatin intermediate layer was applied in a 1.5 μm thickness and then a silver iodobromide emulsion (silver content 6 mol%) which was spectrally sensitized to green light using anhydro-9-ethyl-5,5'-diphenyl-3,3'-di-(3-sulfopropyl)oxacarbocyanine hydroxide (green-sensitive sensitizing dye) and which contained 1-(2,4,6-trichlorophenyl)-3-{3-[(2,4-di-tert-amylphenoxy)acetamido[benzamido}- pyrazolin-5-one (magenta forming coupler) was applied in a 4 μm thickness. The resulting film was cut into five equal pieces. To each of them, one of the coating solutions having the following composition was applied so as to form a yellow filter layer having a 2 μm thickness (the absorption density at the absorption maximum wavelength of the yellow filter layer was 0.9). Further, to the resulting layer, a blue-sensitive silver iodobromide emulsion (silver iodide content: 6 mol%) containing α-(4-methoxybenzoyl)-2-chloro-5-[α-(2,4-di-tert-amylphenoxy)-butyramido]acetanilide (yellow forming coupler) was applied in a 5 μm thickness. Finally, a surface protective layer of gelatin was applied in a 1 μm thickness. These samples were designated Samples 3A to 3E corresponding to each yellow filter layer.

Coating Solutions for the Yellow Filter Layer

3A:
| | |
|---|---|
| Aqueous Solution of Gelatin (8% by weight) | 500 cc |
| Poly(2-diethylaminoethylmethacrylate) Hydrochloride (5% aq. soln.) | 60 cc |
| Comparison Dye A as described in Example 1 (1% aq. soln.) | 120 cc |
| Na Salt of 2,4-Dichloro-6-hydroxy-1,3,5-triazine (1% aq. soln.) | 25 cc |
| Dodecaethyleneglycol-4-nonylphenol Ether (2% aq. soln.) | 30 cc |

3B: In 3A, Dye (1) of the present invention was used instead of Comparison Dye A. The amount of the solution (1% aq. soln.) added was 50 cc.

3C: In 3A, Dye (2) of the present invention was used instead of Comparison Dye A. The amount of the solution (1% aq. soln.) added was 50 cc.

3D: In 3A, Dye (7) of the present invention was used instead of Comparison Dye A. The amount of the solution (1% aq. soln.) added was 50 cc.

-continued

| Coating Solutions for the Yellow Filter Layer | |
|---|---|
| 3E: | |
| Aqueous Solution of Gelatin (containing 8 g of Carey-Lea type yellow colloidal silver (6%) | 500 g |
| Na Salt of 2,4-Dichloro-6-hydroxy-1,3,5-triazine (1% aq. soln.) | 25 cc |
| Polyethyleneglycol-4-nonylphenol Ether (2% aq. soln.) | 30 cc |

Each sample was exposed to light for 1/200 second through a Fuji Color Separation Filter Sp-1, and a continuous gray wedge using a tungsten light source of a color temperature of 5500° K., and then processed as follows:

| Step | Temperature (° C) | Time (min) |
|---|---|---|
| 1. Color Development | 37.8 | 3 ½ |
| 2. Water Washing | " | 1 |
| 3. Bleaching | " | 4 ½ |
| 4. Water Washing | " | 1 |
| 5. Fixing | " | 6 |
| 6. Water Washing | " | 1 |
| 7. Stabilizing | " | 1 |

Each processing solution used had the following composition.

| Color Developer Solution | | |
|---|---|---|
| Sodium Hydroxide | 2 | g |
| Sodium Sulfite | 2 | g |
| Potassium Bromide | 0.4 | g |
| Sodium Chloride | 1 | g |
| Borax | 4 | g |
| Hydroxylamine Sulfate | 2 | g |
| Tetrasodium Ethylenediaminetetraacetate | 2 | g |
| 4-Amino-3-methyl-N-ethyl-N-(β-hydroxyethyl)aniline Sesquisulfate (monohydrate) | 4 | g |
| Water to make | 1 | l |
| Bleaching Solution | | |
| Sodium (Ethylenediaminetetraacetate)-ferric Complex | 100 | g |
| Potassium Bromide | 50 | g |
| Ammonium Nitrate | 50 | g |
| Borax | 5 | g |
| Water to make | 1 | l |
| Fixing Solution | | |
| Sodium Thiosulfate | 150 | g |
| Sodium Sulfite | 15 | g |
| Borax | 12 | g |
| Glacial Acetic Acid | 15 | ml |
| Potassium Alum | 20 | g |
| Water to make | 1 | l |
| Stabilizing Solution | | |
| Borax | 5 | g |
| Sodium Citrate | 5 | g |
| Sodium Metaborate (tetrahydrate) | 3 | g |
| Potassium Alum | 15 | g |
| Water to make | 1 | l |

A photographic characteristic curve was drawn for the yellow image on each processed sample, from which the exposure amount necessary to obtain a density of 0.1 above fog was obtained. The sensitivity is shown as the reciprocal of the exposure amount. The relative value of the sensitivity and presence of stains in each sample were as follows.

| Sample No. | Relative Sensitivity to Blue Light Exposure for Yellow Image | Staining |
|---|---|---|
| 3A | 72 | None |
| 3B | 91 | None |
| 3C | 94 | None |
| 3D | 96 | None |
| 3E | 100 | Present |

| Sample No. | Relative Sensitivity to Blue Light Exposure for Yellow Image | Staining |
|---|---|---|
| | (control) | |

In Sample 3A using Comparison Dye A, the sensitivity of the blue-sensitive emulsion layer was decreased considerably as compared with Control Sample 3E because of the filter effect due to diffusion of the dye from the yellow filter layer into the blue-sensitive emulsion layer. In Samples 3B, 3C and 3D of the present invention, the sensitivity was nearly the same as that of Control Sample 3E wherein colloidal silver was used as the yellow filter layer, and stains formed in Sample 3E were not observed.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive element containing at least one hydrophilic colloid layer containing at least one basic polymer and at least one merocyanine dye represented by the following general formula (I):

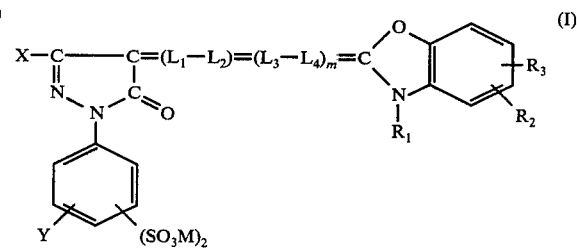

wherein X represents an alkyl group, an aralkyl group, an aryl group, an alkoxy group, a hydroxy group, an amino group, a carboxy group or an alkoxycarbonyl group; Y represents a hydrogen atom, a halogen atom, a lower alkyl group, a hydroxy group or a sulfo group; $R_1$ represents an alkyl group; $R_2$ and $R_3$, which may be the same or different, each represents a hydrogen atom, a halogen atom, an alkyl group, an alkoxy group or an alkoxycarbonyl group; $L_1$, $L_2$, $L_3$ and $L_4$ each represents a methine group; $m$ represents 0 or 1; and M represents a cation.

2. The silver halide photographic light-sensitive element as claimed in claim 1, wherein said alkyl group represented by X is an alkyl group having 1 to 18 carbon atoms.

3. The silver halide photographic light-sensitive element as claimed in claim 2, wherein said alkyl group is an alkyl group having 1 to 4 carbon atoms.

4. The silver halide photographic light-sensitive element as claimed in claim 1, wherein said aralkyl group represented by X is an aralkyl group having 7 to 10 carbon atoms.

5. The silver halide photographic light-sensitive element as claimed in claim 1, wherein said aryl group represented by X is a phenyl group.

6. The silver halide photographic light-sensitive element as claimed in claim 1, wherein said aryl group represented by X is a phenyl group substituted with one or more of a halogen atom, an alkyl group having 4 or less carbon atoms, and an alkoxy group having 4 or less carbon atoms.

7. The silver halide photographic light-sensitive element as claimed in claim 1, wherein said alkoxy group represented by X is an alkoxy group having 1 to 18 carbon atoms.

8. The silver halide photographic light-sensitive element as claimed in claim 1, wherein said amino group is a mono- or di-substituted amino group in which the substituent is selected from the group consisting of an alkyl group having 4 or less carbon atoms, a carbacyl group having 2 to 6 carbon atoms and a phenyl group.

9. The silver halide photographic light-sensitive element as claimed in claim 1, wherein said alkoxycarbonyl group represented by X is an alkoxycarbonyl group having 2 to 20 carbon atoms.

10. The silver halide photographic light-sensitive element as claimed in claim 1, wherein said lower alkyl group represented by Y is an alkyl group having 1 to 4 carbon atoms.

11. The silver halide photographic light-sensitive element as claimed in claim 1, wherein Y is a hydrogen atom or a halogen atom.

12. The silver halide photographic light-sensitive element as claimed in claim 1, wherein said cation represented by M is a hydrogen atom, an alkali metal atom, an alkaline earth metal atom, an inorganic onium group or an organic onium group.

13. The silver halide photographic light-sensitive element as claimed in claim 1, wherein said alkyl group represented by $R_1$ is an alkyl group having 1 to 12 carbon atoms.

14. The silver halide photographic light-sensitive element as claimed in claim 13, wherein said alkyl group is an alkyl group substituted with one or more of a halogen atom, a cyano group, a carboxy group, a sulfo group, a sulfoalkoxy group having 1 to 6 carbon atoms, an alkoxycarbonyl group having 2 to 7 carbon atoms or a phenyl group.

15. The silver halide photographic light-sensitive element as claimed in claim 1, wherein $R_2$ and $R_3$ each represents an alkyl group having 1 to 6 carbon atoms, an alkoxy group having 1 to 6 carbon atoms, or an alkoxycarbonyl group having 2 to 5 carbon atoms.

16. The silver halide photographic light-sensitive element as claimed in claim 1, wherein said methine group is an unsubstituted methine group, a methine group substituted with an alkyl group having 1 to 4 carbon atoms or a methine group substituted with a phenyl group.

17. The silver halide photographic light-sensitive element as claimed in claim 1, wherein said basic polymer is a water-soluble high molecular weight material containing basic groups in the main chain thereof or in a branched chain thereof and which is compatible with gelatin.

18. The silver halide photographic light-sensitive element as claimed in claim 17, wherein said basic polymer is a polymer prepared by polymerizing an ethylenically unsaturated compound having a dialkylaminoalkyl ester group or a polymer prepared by reacting a polyvinylalkylketone or a polyvinylaldehyde with aminoguanidine.

19. The silver halide photographic light-sensitive element as claimed in claim 3, wherein X is said alkyl group.

20. The silver halide photographic light-sensitive element as claimed in claim 1, wherein Y is a hydrogen atom.

21. The silver halide photographic light-sensitive element as claimed in claim 1, wherein $R_2$ and $R_3$ each represent a hydrogen atom.

* * * * *